(12) United States Patent  (10) Patent No.: US 8,941,310 B2
Kim  (45) Date of Patent: Jan. 27, 2015

(54) LED DRIVING CIRCUIT

(75) Inventor: Sungeun Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 174 days.

(21) Appl. No.: 13/391,109

(22) PCT Filed: Aug. 18, 2010

(86) PCT No.: PCT/KR2010/005460
§ 371 (c)(1),
(2), (4) Date: May 2, 2012

(87) PCT Pub. No.: WO2011/021850
PCT Pub. Date: Feb. 24, 2011

(65) Prior Publication Data
US 2012/0206054 A1  Aug. 16, 2012

(30) Foreign Application Priority Data
Aug. 18, 2009 (KR) .................. 10-2009-0076050

(51) Int. Cl.
H05B 37/00 (2006.01)
(52) U.S. Cl.
USPC ..................................... 315/185 R
(58) Field of Classification Search
USPC ...... 315/185 R, 186, 195, 200 R, 201, 209 R, 315/210
See application file for complete search history.

(56) References Cited

U.S. PATENT DOCUMENTS

| 7,781,982 | B2 | 8/2010 | Tatsumi |
| 2003/0235062 | A1 | 12/2003 | Burgyan et al. |
| 2006/0082529 | A1 | 4/2006 | Oyama |
| 2007/0195025 | A1 | 8/2007 | Korcharz et al. |
| 2007/0273681 | A1 | 11/2007 | Mayell |
| 2008/0111800 | A1 | 5/2008 | Wang et al. |
| 2008/0174929 | A1 | 7/2008 | Shen et al. |
| 2008/0297058 | A1 | 12/2008 | Soos |
| 2010/0141162 | A1* | 6/2010 | Matsumoto et al. ........ 315/186 |
| 2010/0148679 | A1* | 6/2010 | Chen et al. ............... 315/185 R |

FOREIGN PATENT DOCUMENTS

| CN | 1760721 A | 4/2006 |
| CN | 201039532 Y | 3/2008 |
| JP | 2007-80771 A | 3/2007 |
| JP | 2007-89333 A | 4/2007 |
| JP | 2007-189004 A | 7/2007 |
| JP | 2007-318983 A | 12/2007 |
| JP | 2008-77892 A | 4/2008 |
| JP | 2008-277079 A | 11/2008 |
| KR | 10-2008-0113947 A | 12/2008 |
| KR | 10-0893193 B1 | 4/2009 |
| TW | 200934300 A | 8/2009 |
| WO | WO 02/096162 A1 | 11/2002 |

* cited by examiner

*Primary Examiner* — Thienvu Tran
(74) *Attorney, Agent, or Firm* — Birch, Stewart, Kolasch & Birch, LLP

(57) ABSTRACT

An LED (Light Emitting device) driving circuit is disclosed, the circuit characterized by: at least two LED strings (120); at least two constant current control blocks (140) for respectively controlling a current path of the at least two LED strings; a detector (160) for detecting a voltage in the at least two constant current control blocks; and a power supply (200) for supplying a driving power to the at least two LED strings (120) in response to the detected voltage.

6 Claims, 3 Drawing Sheets

LED DRIVING CIRCUIT

TECHNICAL FIELD

The present invention relates to an LED driving circuit mounted with a constant current control means.

BACKGROUND ART

LED light source device comprised of a plurality of LED (Light Emitting Diode) strings is rapidly propagated for a wider use in lighting devices and backlight assemblys for LCD panel.

Generally, an LED having a high brightness may be used for various application devices including backlight assemblies for LCD, monitors and televisions (hereinafter collectively referred to as "monitor"). The LEDs applied in a large-sized monitor are generally implemented in one or more strings connected in series.

In order to apply a backlight assembly to the LCD monitor, one of two basic technologies are employed. A first technology is to use one or more strings comprised of a white LED, where the white LED generally includes a blue LED having a fluorescent material. The fluorescent material absorbs the blue light generated by the LED to emit a white light. A second technology is to have one or more individual strings comprised of a colored LED in adjacent arrangement, whereby combined colors come to look white.

However, due to characteristic (e.g., forward voltage drop) deviation among LED elements comprising the LED strings, even LED strings comprising same types of LEDs show mutually different electrical features (e.g., voltage drop). Because of that, in order for the same current to flow through each LED string, there is a need to add a constant current control block connected in series to each LED string for compensating different voltage drops, which is applied with a dissipative active element for compensating the different voltage drops of the LED strings.

However, the dissipative active element suffers from disadvantages in that the dissipative active element, being a significant heat source, increases heat-radiating cost to an entire LED driver, and requires a large capacity of power supply device due to reduced power transmission efficiency.

For example, as illustrated in FIG. 1, an LED driving circuit according to the conventional art includes a power supply 10, an LED string 20 and a constant current control module 40.

In order to operate the LED string 20 in an equal brightness, the constant current control module 40 receives a current passing through the LED string 20 and the constant current control module 40, changes an output amplitude and maintains a constant current.

Furthermore, the constant current control module 40 generates a PWM (Pulse Width Modulation) control signal for linearly controlling the brightness dimming whereby duty ratio can be controlled. The constant current control module 40 functions as a load absorbing a voltage difference caused by a voltage increase/decrease of the LED string 20 by performing a linearly switching operation.

The elements comprising the constant current control module 40 receives a requirement of high element ratings including high voltage and high power, if the number of serially connected LED elements comprising the LED string 20 is increased to thereby supply a high power. Furthermore, an increased driving power deepens a heat-generating problem resultant from a high power of the linearly operating switch elements. As a result, a range of selecting elements for forming the illustrated constant current control module 40 is narrowed to increase the manufacturing cost.

DISCLOSURE OF INVENTION

Technical Problem

The present invention is disclosed to provide an LED driving circuit including LED protection means capable of reducing heat amount. The present invention is also disclosed to provide an LED driving circuit including LED protection means capable of reducing the manufacturing cost.

Solution to Problem

In some exemplary embodiments of the present invention, an LED driving circuit is characterized by: at least two LED strings; at least two constant current control blocks for respectively controlling a current path of the at least two LED strings; a detector for detecting a voltage in the at least two constant current control blocks; and a power supply for supplying a driving power to the at least two LED strings in response to the detected voltage.

Advantageous Effects of Invention

The LED driving circuit according to the present invention thus configured has an advantage in that it can effectively drive the LED elements to thereby reduce generation of heat amount. Another advantage is that the LED driving circuit can reduce the manufacturing cost by configuring the circuit with inexpensive elements.

BEST MODE FOR CARRYING OUT THE INVENTION

Figure 1:
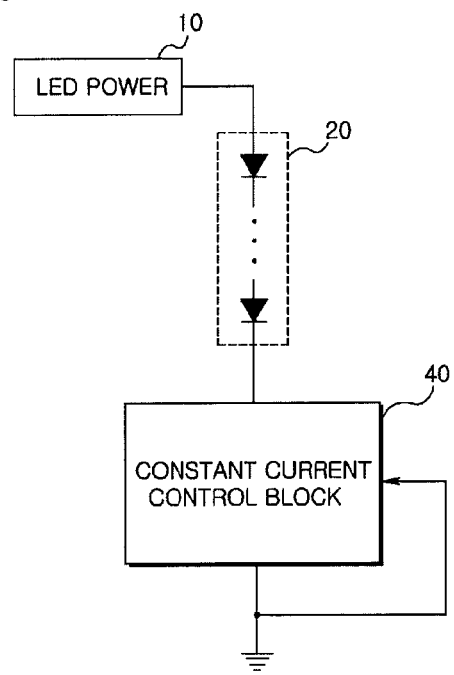
FIG. 1 is a schematic circuit diagram illustrating a configuration of a conventional LED driving circuit.
Figure 2:
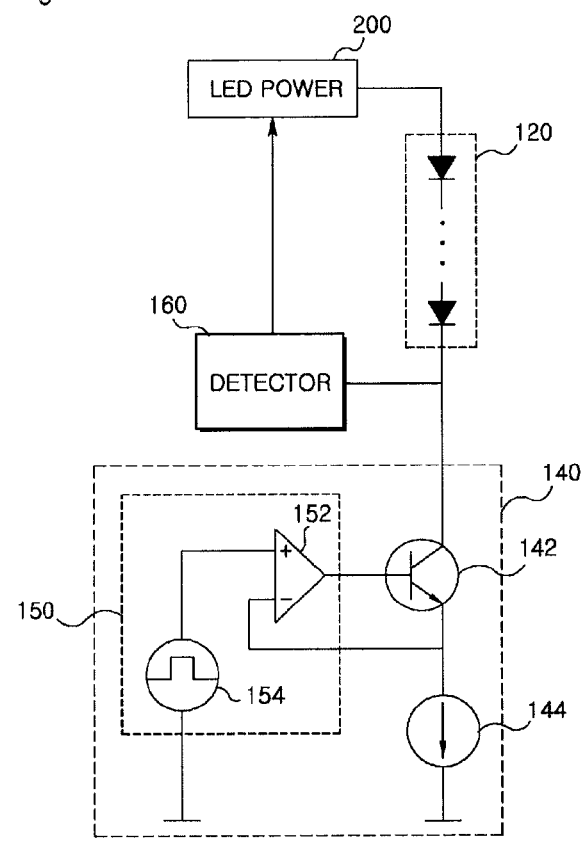
FIG. 2 is a schematic circuit diagram illustrating an LED driving circuit according to an exemplary embodiment of the present invention.

FIG. 2 is a schematic circuit diagram illustrating an LED driving circuit according to an exemplary embodiment of the present invention.

The LED (Light Emitting device) driving circuit may include at least two LED strings (120); at least two constant current control blocks (140) for respectively controlling a current path of the at least two LED strings; a detector (160) for detecting a voltage in the at least two constant current control blocks; and a power supply (200) for supplying a driving power to the at least two LED strings (120) in response to the detected voltage.

The constant current control block (140) may include a constant current source (144) causing a constant current to flow in a current path of the LED strings (120), a linear element (142) providing a variable resistance component to the current path of the LED string (120), and a feedback control element (150) controlling a resistance value of the linear element according to an electrical characteristic of the current path of the LED string (120).

The linear element (142) may be a bipolar transistor linearly controlling a channel width in response to a base terminal current. The feedback control element (150) may include an operation amplifier (152) receiving through a − input terminal a voltage of a connecting node of the linear element (142) and the constant current source (144), receiving through a + input terminal a PWM signal and connected at an output terminal to a base terminal of a bipolar transistor, and a PWM signal generator (154) generating a PWM signal.

Figure 3:
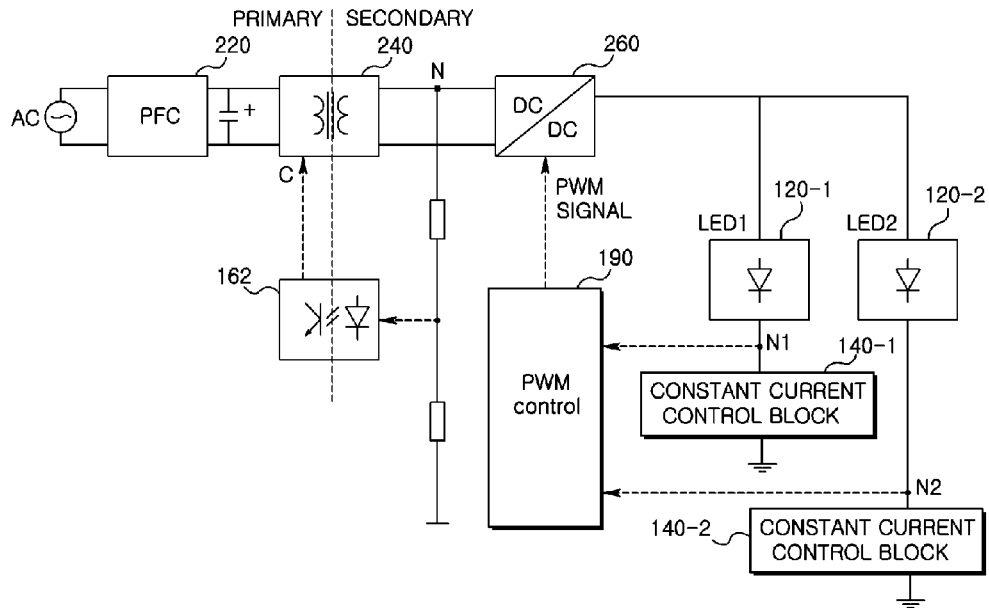
FIG. 3 is a schematic circuit diagram illustrating an LED driving circuit according to another exemplary embodiment of the present invention.

FIG. 3 is a schematic circuit diagram illustrating in detail the power generator (200) of FIG. 2 in the LED driving circuit according to another exemplary embodiment of the present invention.

The LED driving circuit may include at least two LED strings (120-1, 120-2), at least two constant current control blocks (140-1, 140-2) for respectively controlling a current path of the at least two LED strings (120-1, 120-2), a detector (162) for detecting a voltage in the at least two constant current control blocks (140-1, 140-2), a PFC (Power Factor Correction) converter (220) converting a power inputted from an external AC (Alternative Current) power to a DC (Direct Current) power, an SMPS (Switched-Mode Power Supply. 240) converting the DC power converted by the PFC converter to a DC power of different voltage according to the voltage detected by the detector (162), and a DC-DC converter (260) converting the DC power outputted from the SMPS (240) to a DC power suitable for LED driving to supply the DC power to the at least two LED strings.

According to the LED driving circuit, the detector 160 does not detect a voltage of the at least two constant current control blocks (140-1, 140-2), but detects a voltage of a connecting node of the SMPS (240) and the DC-DC converter (260) that is determined by a voltage of the at least two constant current control blocks (140-1, 140-2). In the drawing, the detector 162 may include a photo coupler structure to stop an electrical influence from a primary side and a secondary side of the SPMS.

The SMPS (240) may further include switching elements for converting DC to AC, and an intermittent switch element preventing a driving signal driving the switching elements from being transmitted to the switching elements, where the intermittent switch element may be turned on/off in response to an output signal of the detector (162).

Meanwhile, a feedback control using the detector (162) and the SMPS (240), and a feedback control applying the voltage directly detected by the at least two constant current control blocks (140-1, 140-2) to the DC-DC converter (260) may be employed to enhance a feedback control efficiency to the power supply. To this end, the LED driving circuit may further include a PWM controller (190) controlling a switching operation of the SMPS (240) in response to the voltage of a connecting node of the constant current control blocks (140-1, 140-2) and the LED strings (120-1, 120-2).

The PWM controller (190) may generate a PWM signal for driving the switching element of the DC-DC converter (260) according to a result of performing a predetermined operation process by receiving the voltage of the connecting node of the constant current control blocks (140-1, 140-2) and the LED strings (120-1, 120-2). For example, it is assumed that the DC-DC converter (260) is mounted with a charge pump, and the switching element is an element for pumping operation of the charge pump. In this case, the PWM controller (190) controls the PWM control signal to reduce a pumping frequency of the charge pump, if the voltage (at least one of the voltages in the at least two connecting nodes) of the connecting node of the constant current control blocks (140-1, 140-2) and the LED strings (120-1, 120-2) comes to excessively increase.

Mode for the Invention

Figure 4:
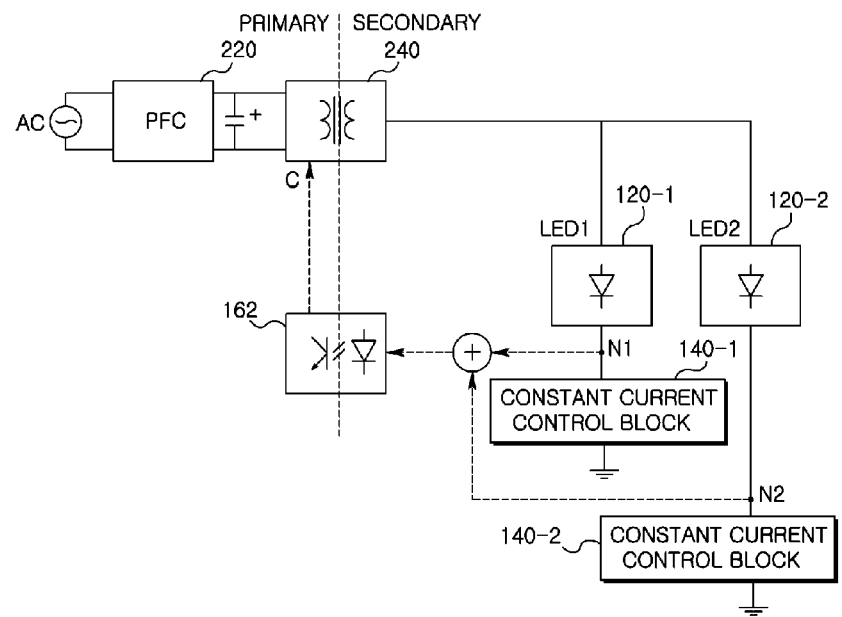
FIG. 4 is a schematic circuit diagram illustrating an LED driving circuit according to still another exemplary embodiment of the present invention.

FIG. 4 is a schematic circuit diagram illustrating an LED driving circuit according to still another exemplary embodiment of the present invention.

The LED driving circuit may include at least two LED strings (120-1, 120-2), at least two constant current control blocks (140-1, 140-2) for respectively controlling a current path of the at least two LED strings (120-1, 120-2), a detector (162) for detecting a voltage in the at least two constant current control blocks (140-1, 140-2), a PFC (Power Factor Correction) converter (220) converting a power inputted from an external AC (Alternative Current) power to a DC (Direct Current) power, and an SMPS (Switched-Mode Power Supply. 240) converting the DC power converted by the PFC converter to a DC power of different voltage and supplying the DC power to the at least two LED strings (120-1, 120-2) according to the voltage detected by the detector (162).

The detector (162) may receive a value obtained by mixing the voltages (more than two voltages) of the connecting nodes of two constant current control blocks (140-1, 140-2) and two LED strings (120-1, 120-2). A mixer (M) of at least two detection voltages may be implemented by an accumulator of two analogue values or a computing unit seeking an average value.

Furthermore, the detector (162) may include a photo coupler structure to prevent electrical influence from the primary and secondary sides of the SPMS (240). The SPMS (240) may further include switching elements for converting AC to DC and an intermittent switch element for intermittently preventing a driving signal driving the switching elements from being transmitted to the switch element, where the intermittent switch element may be turned on/off in response to an output signal of the detector (162).

Figure 5:
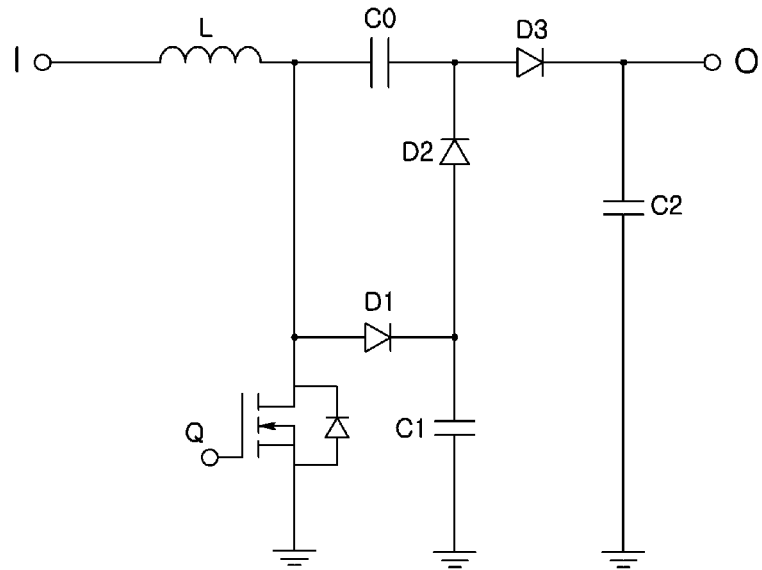
FIG. 5 is a circuit diagram illustrating a DC-AC converter of an LED driving circuit according to an exemplary embodiment of the present invention.

FIG. 5 is a circuit diagram illustrating a DC-AC converter (260) of an LED driving circuit according to an exemplary embodiment of the present invention, where the DC-AC converter (260) may include a charge pump structure and performs the charge pumping in response to ON/OFF of an FET (Field Effect Transistor, Q). The PWM control signal of FIG. 3 may PWM-control the FET (Q).

Figure 6:
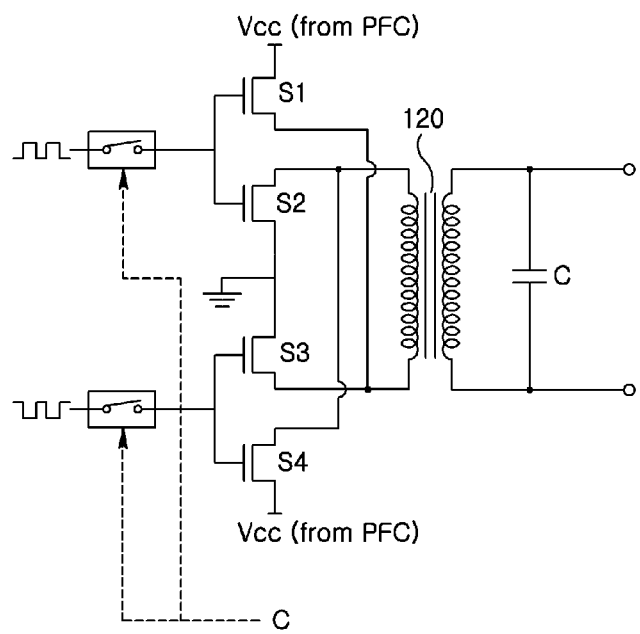
FIG. 6 is a circuit diagram illustrating an exemplary embodiment of SPMS of an LED driving circuit according to the present invention.

FIG. 6 is a circuit diagram illustrating an exemplary embodiment of SPMS (240) of an LED driving circuit according to the present invention, where the SPMS (240) may include four FETs (S1-S4) which are switching elements for converting DC to AC, an intermittent switch element (SW1) for intermittently restricting a driving signal for driving the switching elements from being transmitted to the switching elements, and a transformer (T). The intermittent switch element (SW1) may be turned on/off by an output signal (C) from the detector (162) of FIG. 3 or FIG. 4.

While the present disclosure has been particularly shown and described with reference to exemplary embodiments thereof, the general inventive concept is not limited to the above-described embodiments. It will be understood by those of ordinary skill in the art that various changes and variations in form and details may be made therein without departing from the spirit and scope of the present invention as defined by the following claims.

For example, although the present invention has exemplified an LED driving circuit driving two LED strings, the present invention may be easily applied by an LED driving circuit driving three or more LED strings, which also belongs to the scope of the present invention.

INDUSTRIAL APPLICABILITY

The LED driving circuit according to the present invention thus configured has an industrial applicability in that it can effectively drive the LED elements to thereby reduce generation of heat amount. Another applicability is that the LED driving circuit can reduce the manufacturing cost by configuring the circuit with inexpensive elements.

The invention claimed is:

1. An LED (Light Emitting Device) driving circuit, the circuit comprising:
   an LED string including at least an LED;
   a constant current control block configured to control a current path of the LED string;
   a detector configured to detect a voltage in the current control block;
   a switched-mode power supply (SMPS) configured to transform inputted power in response to the voltage from the detector;
   a DC-DC converter configured to convert the power outputted from the SMPS to a power suitable for LED driving to supply the power to the LED string; and
   a PWM controller configured to control a switching operation of the SMPS in response to the detected voltage by the detector.

2. The circuit of claim 1, wherein the detector is further configured to detect a voltage at a connecting node of the SMPS and the DC-DC converter.

3. The circuit of claim 2, wherein the PWM controller is further configured to receive a voltage at a connecting node of the LED string and the constant current control block.

4. The circuit of claim 1, further comprising:
   a PFC (Power Factor Correction) converter configured to convert a power from an external AC power to DC power and to supply the converted power to the SMPS.

5. The circuit of claim 1, wherein the detector includes a photo coupler converting the detected voltage value to an optical signal.

6. The circuit of claim 1, wherein the constant current control block comprises:
   a constant current source configured to cause a constant current to flow in a current path of the LED string;
   a linear element connected between the LED string and the constant current source and configured to provide a variable resistance component to the current path of the LED string; and
   a feedback control element configured to control a resistance value of the linear element according to an electrical characteristic of the current path of the LED string.

* * * * *